Patented Nov. 19, 1935

2,021,621

UNITED STATES PATENT OFFICE 2,021,621

PROTEIN FOOD COLOR AND METHOD OF PRODUCING SAME

Hugh E. Allen and Albert G. McCaleb, Evanston, Ill.

No Drawing. Application April 1, 1935, Serial No. 14,123

10 Claims. (Cl. 99—11)

Our invention contemplates and provides a completely cured animal-protein product suitable for introduction into various foods to tint same and add thereto a desirable nutriment.

The product of the invention is a dry powder of great tinctorial strength, comprising animal blood hæmoglobin thoroughly and permanently cured with the aid of mono-sodium glutamate.

One species of the product carries potent curing salts which are inert with respect to their vehicle but act suitably to cure ground meats into which the vehicle may be introduced in the manufacture of various kinds of sausages, Frankfurters, etc.

In certain respects, the present invention is in the nature of an improvement on the teachings of United States Letters Patent No. 1,956,785, which were granted to us, on May 1, 1934, for a Protein food color and method of producing the same.

We have discovered that monosodium glutamate has a remarkable affinity for hæmoglobin, when these materials are heated together. The interaction which apparently occurs between these substances at fairly high temperatures, for example, temperatures from 150° F. to 200° F. (and more particularly at temperatures from 160° F. to 170° F.) results in a product which, in dry condition, is cured and resistant to decomposition when stored for prolonged periods. The resulting compound is capable of being dissolved in aqueous fluids such as meat juices and can be used to impart a highly pleasing color to ground meats such as go into sausages and the like. For the production of this product it is preferred to evaporate water from aqueous hæmoglobin mixed with monosodium glutamate under conditions which avoid excessively high temperatures such as might impair the tinctorial efficiency or food value of the protein content. The mixture may be dried under vacuum according to any of the well known procedures. In large scale production, however, it is preferred to spray the mixture into a dry hot air stream, in which the temperatures are held within the ranges indicated above. The curing reaction between the hæmoglobin and the monosodium glutamate appears to occur completely and instantaneously at temperatures within these ranges.

So marked is the affinity of hæmoglobin and mono-sodium glutamate, that very potent curing salts, such as sodium nitrite, sodium nitrate and potassium nitrate, apparently are not given much, if any, opportunity to react with hæmoglobin, with which such potent curing salts are intermixed, when mono-sodium glutamate also is present under the temperature conditions necessary to its efficacy as a curing agent for hæmoglobin.

Furthermore, hæmoglobin, which has been properly cured with mono-sodium glutamate, may have entrained with it, for long periods of time, at ordinary temperatures, any or all of the aforesaid potent curing salts without there being detectable any darkening effect, or other objectionable reactive effect, of such potent curing salts upon the hæmoglobin. In such cases the potent curing salts apparently are quite inert with respect to the reaction product of hæmoglobin and mono-sodium glutamate, but remain ready to exert, with all vigor, their characteristic curing effects upon certain foods into which their vehicle of cured hæmoglobin is introduced.

The ascertainment of these phenomena has enabled us to provide, as one species of the product of the present invention, a meat treating composition which shows no appreciable deterioration over long periods of time, and which, when introduced into fresh ground meats, e. g., as in sausage and Frankfurter manufacture, will cure the ground meats as well as properly color the same with nature's own agent for tinting animal tissues i. e., the hæmoglobin of blood.

In manufacturing the nitroso-cured product of our aforesaid Patent No. 1,956,785, it has been deemed necessary that the amount of potent curing salt, or salts, in the product be kept down to a percentage barely sufficient to effect the requisite cure of the hæmoglobin—lest an excess of potent curing salt eventually "burn" and thus impair the tinctorial strength of the hæmoglobin.

Other features, objects and advantages of our invention will appear from the following detailed description, in which we have set forth, inter alia, the procedural steps in the preferred method of producing our new product.

Up to the point where we introduce monosodium glutamate into aqueous hæmoglobin, the procedural steps in the making of the product of the present invention need not differ from corresponding steps in the method of our earlier patent hereinbefore mentioned. However, since it quickly may be done, we shall re-state those procedural steps which are common to our present method and our earlier method, in order that this specification may be complete within itself.

We utilize animal blood which is so fresh that it has not coagulated to any appreciable extent as a result of its exposure to the air. Beef blood is preferred, but the blood of various other edible animals may be employed, if desired.

The first phase in the treatment of the blood aptly may be termed "defibrination". This part of the method is performed by agitating the blood very violently, preferably by means of a motor driven agitator, for a period of from five to ten minutes. After this period of violent agitation, a stringy fibrous mass (fibrinogen) rises to the top of the blood under treatment, and is skimmed therefrom. The blood is then again violently agitated for a period of from five to ten minutes, is again permitted to remain quiescent, and the stringy fibrous mass which rises to the top of the blood under treatment is again skimmed therefrom. Ordinarily, in the spring and summer, two periods of vibration, two periods of quiescence and two skimmings, as aforesaid, will be found sufficient to effect the removal of all of the stringy fibrous material from the blood under treatment. However, at other times in the year, five or more violent agitations, each followed by a period of quiescence and skimming, may be necessary entirely to remove the stringy fibrous material from the blood under treatment. By virtue of this defibrination, the blood under treatment is thereafter prevented from coagulating even under extremely cold temperatures. Defibrination also facilitates the mechanical separation of the remaining constituents of the blood in the manner next to be described.

The defibrinated blood is next placed in and operated upon by a centrifugal separator to separate (a) the hæmoglobin (i. e., protein plus hæmatin) and a minor portion of the entrained aqueous constituent of the blood), from (b) the blood serum, albuminous matter and the excess aqueous content of the blood under treatment. The aqueous hæmoglobin has greater specific gravity than the aqueous serum and albuminous matter and, as it comes from the centrifugal separator, is dark red in color. The aqueous solution of serum and albuminous matter is light amber in shade. By initially adjusting the separator so that a slight pinkish streak appears in the amber solution of serum and albuminous matter and then readjusting the separator just sufficiently to exclude such pinkish streak, the proper separation of the aqueous hæmoglobin from the serum, albuminous matter and excess aqueous content of the blood is readily obtained.

Here our present method specifically departs from the teachings of Patent No. 1,956,785.

The aqueous hæmoglobin, now quite highly concentrated, is next placed in a glass lined tank wherein its temperature is reduced to a point between 40° F. and 50° F. We then add from one (1) to five (5) pounds of mono-sodium glutamate to each one hundred (100) pounds of the chilled aqueous hæmoglobin. The chilled mixture is then violently agitated for a period of from five (5) to fifteen (15) minutes, thoroughly to distribute the minute particles of the mono-sodium glutamate throughout the hæmoglobin. Throughout the agitation no ascertainable reaction occurs between the mono-sodium glutamate and the hæmoglobin.

We next dehydrate the chilled and agitated mixture in a spray drier, in which the air stream (into which is sprayed the material to be dehydrated) is maintained at a temperature between 150° F. and 200° F. While air stream temperatures in the fifty degree range just stated are tolerable, we realize most satisfactory results by maintaining the air stream temperature within a ten degree range from 160° F. to 170° F.

A reaction between the mono-sodium glutamate and the hæmoglobin occurs when they strike the hot air stream. We believe this reaction to be instantaneous. At any rate, the dehydrated reaction product which collects in the bottom of the dehydrating chamber is found to be a completely cured powder in which the natural color of the hæmoglobin has been retained and somewhat intensified.

The said dry protein powder, produced as just explained, has great tinctorial strength,—a property which in no way diminishes with the lapse of time and/or exposure of the powder to atmospheric influences, provided, the powder is kept under ordinary temperatures, i. e., temperatures substantially less than 150° F. In this respect the powder of the present invention is superior to the powder of our prior Patent No. 1,956,785.

In order to guard against "burning" there is a natural tendency on the part of the manufacturer to minimize the percentage of potent curing salts in the product of Patent No. 1,956,785, even to the extent of impairing, to some degree, its keeping qualities. In the case of the powder of the present invention, the curing of the hæmoglobin by the mono-sodium glutamate does not continue after dehydration if the powder is kept under ordinary temperature conditions, that is, at temperatures well under 150° F.

If desired, the cured hæmoglobin powder, as marketed, may contain a minor percentage of common salt. In such cases the weight of the common salt is desirably 1% to 3% of the weight of the concentrated aqueous hæmoglobin which has been converted into the powder wherein the common salt appears. Said common salt may be mechanically intermixed with the powder, but we prefer to place it in solution with the hæmoglobin and mono-sodium glutamate immediately prior to dehydration.

Our novel food tinting powder, prepared as hereinbefore described, is available and desirable for use in coloring food products of many kinds,— due to its great tinctorial strength, the completeness of its cure, the nutritive value of its protein content, its solubility in water and meat juices, and a certain pleasant flavor imparted by the mono-sodium glutamate.

In making that species of our new product which is intended to effect the curing as well as the tinting of ground meats as, for example, in sausage and Frankfurter manufacture, our method is modified as follows:

Just before dehydrating the chilled mixture of hæmoglobin and mono-sodium glutamate, we introduce therein, and very quickly and thoroughly intermix therewith, potent curing salts (sodium nitrite, sodium nitrate and/or potassium nitrate) in such amounts as are requisite for the proper cure of the ground meats into which the meat treating powder is to be introduced. In practice we prefer to employ sodium nitrite and sodium nitrate as the added potent curing salts,—the weight of the sodium nitrite being from 1% to 5% of the weight of the chilled hæmogobin to which it is added, and the weight of the sodium nitrate being from 1% to 10% of the weight of the chilled hæmoglobin. Common salt may also appear in the meat treating powder. Dehydration is performed as promptly as possible after the introduction of the potent curing salts in order that the cure of the hoæmoglobin may be effected by the mono-sodium glutamate and not, to any significant degree, by the potent curing salts.

A powder, produced as just described, is of great utility in the making of sausages, Frankfurters, and other ground meat products. Such a powder not only tints and adds desirable nutriment and flavor to the ground meats into which it is introduced, but also supplies the potent curing salts wherewith to give such ground meats their requisite cure.

While we prefer to introduce the potent curing salts into the chilled hæmoglobin and mono-sodium glutamate immediately before the dehydration step, we appreciate that such potent curing salts may be mechanically intermixed with the reaction product of hæmoglobin and mono-sodium glutamate after the dehydration of such reaction product. In either case the potent curing salts appear to be inert so far as the reaction product is concerned. They do not "burn" such reaction product, even though considerable time may elapse between the manufacture and ultimate use of the meat treating powder.

The meat treating powder is conveniently added to sausage or Frankfurter meats by being sprinkled over the meat chunks before the latter go through the grinder, in order that the powder may be mechanically ground into the meat as the meat itself is ground.

Having thus described our invention, what we claim is new and desire to secure by Letters Patent of the United States is:

1. In a material wherewith to tint foodstuffs, the reaction product of animal blood hæmoglobin and mono-sodium glutamate.

2. In a food tinting composition, animal blood hæmoglobin and mono-sodium glutamate, the composition comprising from one (1) to five (5) pounds of mono-sodium glutamate for each one hundred (100) pounds of the hæmoglobin.

3. In a material for introduction into ground meats to tint and cure the same, the combination of the reaction product of animal blood hæmoglobin and mono-sodium glutamate intermixed with and constituting a non-reactive vehicle for potent curing salts of the group including sodium nitrite, sodium nitrate and potassium nitrate.

4. The method of making a product wherewith to tint foodstuffs which consists in admixing mono-sodium glutamate with aqueous hæmoglobin in substantially the proportions of from one (1) to five (5) pounds of the mono-sodium glutamate for each one hundred (100) pounds of the aqueous hæmoglobin, and spraying the mixture into a dehydrating atmosphere.

5. The method of making a product wherewith to tint foodstuffs, which consists in admixing mono-sodium glutamate with hæmoglobin and subjecting the mixture to a temperature between 150° F. and 200° F. to promote a reaction between the mono-sodium glutamate and the hæmoglobin.

6. The method of making a product wherewith to tint foodstuffs which consists in admixing mono-sodium glutamate with aqueous hæmoglobin and spraying the mixture into a dehydrating atmosphere maintained at a temperature between 150° F. and 200° F.

7. The method which consists in mixing together concentrated aqueous hæmoglobin and mono-sodium glutamate in the proportions of from (1) to five (5) pounds of mono-sodium glutamate to each one hundred (100) pounds of the aqueous hæmoglobin, chilling and agitating the mixture, and then dehydrating the mixture at a temperature of 150° F. to 200° F.

8. The method which consists in mixing mono-sodium glutamate with aqueous hæmoglobin, agitating said mixture, adding to the mixture potent curing salts from the group including sodium nitrite, sodium nitrate and potassium nitrate, and immediately spraying the materials under treatment into a dehydrating atmosphere.

9. The method of making a product wherewith to tint foodstuffs, which consists in admixing mono-sodium glutamate with aqueous hæmoglobin, and dehydrating the mixture.

10. The method of making a product wherewith to tint foodstuffs, which consists in admixing mono-sodium glutamate, aqueous hæmoglobin and potent curing salts of the group including sodium nitrite, sodium nitrate and potassium nitrate, and dehydrating the mixture.

HUGH E. ALLEN.
ALBERT G. McCALEB.